US011303133B2

(12) United States Patent
Overbeck et al.

(10) Patent No.: US 11,303,133 B2
(45) Date of Patent: Apr. 12, 2022

(54) PHOTOVOLTAIC INVERTER AND METHOD FOR OPERATING A PHOTOVOLTAIC INVERTER

(71) Applicant: Fronius International GmbH, Pettenbach (AT)

(72) Inventors: Ruben Overbeck, Pettenbach (AT); Gerhard Wallisch, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 17/267,616

(22) PCT Filed: Aug. 12, 2019

(86) PCT No.: PCT/EP2019/071523
§ 371 (c)(1),
(2) Date: Feb. 10, 2021

(87) PCT Pub. No.: WO2020/035426
PCT Pub. Date: Feb. 20, 2020

(65) Prior Publication Data
US 2021/0320501 A1 Oct. 14, 2021

(30) Foreign Application Priority Data
Aug. 13, 2018 (AT) .............................. A 50689/2018
Nov. 15, 2018 (EP) ..................................... 18206383

(51) Int. Cl.
*H02J 3/38* (2006.01)
*H02M 1/00* (2006.01)
(Continued)

(52) U.S. Cl.
CPC ................ *H02J 3/381* (2013.01); *H02J 7/35* (2013.01); *H02M 1/0006* (2021.05); *H02M 3/04* (2013.01); *H02J 2300/24* (2020.01)

(58) Field of Classification Search
CPC ...... H02J 3/381; H02J 3/38; H02J 7/35; H02J 2300/24; H02M 1/0006; H02M 3/04; H02M 1/00
See application file for complete search history.

(56) References Cited

U.S. PATENT DOCUMENTS

2005/0006958 A1   1/2005   Dubovsky
2011/0133552 A1   6/2011   Binder et al.
(Continued)

FOREIGN PATENT DOCUMENTS

AU   2008101271 A4    3/2010
WO   2008/138020 A1   11/2008
WO   2013/185955 A2   12/2013

OTHER PUBLICATIONS

International Search Report in PCT/EP2019/071523, dated Oct. 10, 2019.
(Continued)

*Primary Examiner* — Robert L Deberadinis
(74) *Attorney, Agent, or Firm* — Collard & Roe, P.C.

(57) ABSTRACT

A photovoltaic inverter has a DC input for connection to a DC source, a DC-DC converter, an intermediate circuit, a DC-AC converter, an AC disconnector, a control device, an AC connection for connection to a supply network and, if present, a consumer, a battery stage, and a battery connection for connection to a buffer battery, and a method operates a photovoltaic inverter of this kind. A switched-mode power supply is connected on the input side to the AC connection and on the output side to the battery stage so that, if the DC source is deactivated, the intermediate circuit can be charged up to a threshold value via the switched-mode power supply and the battery stage, whereupon the AC disconnector can be actuated and the photovoltaic inverter can be connected to the supply network.

9 Claims, 3 Drawing Sheets

(51) Int. Cl.
     *H02J 7/35*      (2006.01)
     *H02M 3/04*     (2006.01)

(56) References Cited

U.S. PATENT DOCUMENTS

2013/0113413 A1   5/2013   Harty
2018/0037121 A1   2/2018   Narla

OTHER PUBLICATIONS

Austrian Office Action in A 50689/2018, dated Feb. 14, 2019, with English translation of relevant parts.
European Search Report in EP 18206383.4-1203, dated Jun. 17, 2019, with English translation of relevant parts.

PHOTOVOLTAIC INVERTER AND METHOD FOR OPERATING A PHOTOVOLTAIC INVERTER

CROSS REFERENCE TO RELATED APPLICATIONS

This application is the National Stage of PCT/EP2019/071523 filed on Aug. 12, 2019, which claims priority under 35 U.S.C. § 119 of Austrian Application No. A 50689/2018 filed on Aug. 13, 2018 and European Application No. 18206383.4 filed on Nov. 15, 2018, the disclosures of which are incorporated by reference. The international application under PCT article 21(2) was not published in English.

BACKGROUND OF THE INVENTION

1. Field of the Invention

The invention relates to a photovoltaic inverter with a DC input for connection to a DC source, a DC-DC converter, an intermediate circuit, a DC-AC converter, an AC disconnector, an AC connection for connection to a supply network and, if present, a consumer, a battery stage, and a battery connection for connection to a buffer battery.

The invention also relates to a method for operating a photovoltaic inverter, wherein the photovoltaic inverter has a DC input for connection to a DC source, a DC-DC converter, an intermediate circuit, a DC-AC converter, an AC disconnector, an AC connection for connecting to a supply network and, if present, a consumer, a battery stage, and a battery connection for connecting to a buffer battery.

2. Description of the Related Art

For example, WO 2008/138020 A1 or US 2011/0133552 A1 describes such a hybrid inverter that can be both connected to a supply network and operated as a stand-alone inverter to supply consumers with electrical energy, and a method for its control.

US 2018/0037121 A1 describes a hybrid inverter specifically designed for charging the battery of an electric vehicle.

In US 2005/0006958 A1 an inverter is disclosed that can be extended with an "add-on back-up power module". It describes energy flows relating to energy storage for supplying energy to consumers.

In order to connect an inverter to a supply network, the intermediate circuit voltage must be raised to the peak line voltage before the AC disconnector is closed. This is achieved by converting the voltage of the DC source (solar panel or buffer battery) accordingly. However, if the solar panels or the buffer battery are not supplying a voltage, it is usually not possible to increase the intermediate circuit voltage.

One option is a special interconnection of filter capacitors, so that they can be used as series capacitors for charging the intermediate circuit via the DC-AC converter. The disadvantage of this variant, however, is that additional leakage currents via the solar panels can result. In addition, the wiring effort is increased.

Another option is the use of a separate circuit for uploading the intermediate circuit voltage without a DC source from the supply network. However, this solution also requires space on the printed circuit board of the inverter and incurs additional costs.

For the above reasons, in some photovoltaic inverters without a DC source or buffer battery, the process of uploading from the supply network is also omitted, which degrades the energy management performance of the photovoltaic inverter, however.

SUMMARY OF THE INVENTION

The object of the present invention is the creation of a photovoltaic inverter as mentioned above, and a method for operating such a photovoltaic inverter, so that the photovoltaic inverter can be started at any time and independently of whether a voltage from the DC source is present, for example during twilight or night-time hours. The wiring effort and the additional manufacturing costs incurred for this should be as low as possible.

The solution to the object according to the invention is provided by an inverter described above, wherein a switched-mode power supply is provided, which switched-mode power supply is connected to the AC connection on the input side and to the battery connection on the output side, so that when the DC source is deactivated the intermediate circuit can be charged up to a threshold value via the switched-mode power supply and the battery stage, whereupon the AC disconnector can be actuated. According to the invention, it is therefore provided that, if the DC source is deactivated or inactive, i.e. when the solar panels are not supplying energy during twilight hours or during the night, or due to snow, or if the DC source is disconnected from the photovoltaic inverter, the intermediate circuit is charged via the switched-mode power supply and the battery stage until the voltage required for connecting the photovoltaic inverter to the supply network is reached on the intermediate circuit. The photovoltaic inverter is then switched to the supply network by actuation or closure of the AC disconnector, i.e. by closing the AC disconnector. Thereafter, either the buffer battery can be charged via the supply network or energy can be fed into the supply network from the buffer battery. Likewise, reactive power can be compensated by the photovoltaic inverter. The circuit complexity is low, as the existing battery stage can also be used for this function and no separate uploading circuit is required, which would require corresponding space on the printed circuit board of the photovoltaic inverter. No current measurement is therefore necessary for the voltage-controlled charging of the intermediate circuit. A current sensor that may additionally be present for measuring the higher charging/discharging currents of the buffer battery would be too inaccurate for these purposes. The control device controls and activates or deactivates all components of the photovoltaic inverter.

A diode is advantageously arranged on the output side of the switched-mode power supply. This diode between the switched-mode power supply and the battery stage prevents a current flow from the battery stage to the switched-mode power supply.

A battery switch is advantageously provided for connecting and disconnecting the buffer battery. Such a battery switch allows the buffer battery to be connected only when required, when energy is being extracted from the battery to supply consumers or when the battery needs to be charged.

The battery stage is preferably formed by a bidirectional DC-DC converter, in particular by a boost converter with synchronous rectification having two semiconductor switches. Such a bidirectional DC-DC converter or boost converter can be operated in both directions, i.e. for charging the buffer battery by transforming the intermediate circuit voltage up to the desired battery charge voltage and for transforming the voltage provided by the buffer battery up to the desired intermediate circuit voltage to supply the consumers with electrical energy, or for feeding in energy from the buffer battery into the supply network or stand-alone network.

Advantageously, the battery stage is connected to the control device, which control device is designed to charge the intermediate circuit with essentially constant power drain from the switched-mode power supply by allowing the semiconductor switches of the boost converter to be controlled with a specified duty cycle. In order not to overload the switched-mode power supply during charging of the intermediate circuit voltage, the semiconductor switches of the battery stage implemented as a boost converter are activated with an appropriate duty cycle, which ensures that the power drain from the switched-mode power supply is essentially constant.

The control device is connected to a programmable memory, in which the respective rule for the activation of the semiconductor switches of the battery stage is stored accordingly, in order to be able to prevent overloading of the switched-mode power supply. Corresponding formulas for the duty cycle of the activation of the semiconductor switches of the battery stage or corresponding tables can be stored in the programmable memory.

The object according to the invention is also achieved by a method as mentioned above for operating a photovoltaic inverter, wherein a switched-mode power supply is supplied from the AC connection and, when the DC source is deactivated, is used to charge the intermediate circuit via the battery stage up to a threshold value, at which point the AC disconnector is actuated and the photovoltaic inverter is connected to the supply network. This results in optimized energy management even when the DC source of the photovoltaic system is deactivated, by charging the intermediate circuit via the switched-mode power supply and the battery stage until it is possible to connect the photovoltaic inverter to the supply network by actuating or closing the AC disconnector. After the photovoltaic inverter has been connected, the buffer battery can be charged via the supply network or energy can be fed into the supply network from the buffer battery. Likewise, reactive power can be compensated by the photovoltaic inverter. For details of further achievable advantages as a result, reference is made to the above description of the photovoltaic inverter.

Preferably, the buffer battery is connected and disconnected via a battery switch.

According to another feature of the invention, the intermediate circuit is charged via the switched-mode power supply with constant power, by the battery stage being formed by a bidirectional DC-DC converter, in particular a boost converter with synchronous rectification having two semiconductor switches, which are activated with an appropriate duty cycle. Charging with constant power takes into account the fact that the switched-mode power supply can only provide a limited power or voltage. Overloading of the switched-mode power supply is therefore prevented.

Advantageously, before charging the intermediate circuit via the switch-mode power supply, the voltage at the intermediate circuit is measured and used as a starting voltage, and the duty cycle for activating the semiconductor switches of the battery stage is determined as a function of the starting voltage. This can ensure that the switched-mode power supply is not overloaded, but without the need for current measurement.

Advantageously, the photovoltaic inverter is connected by closing the AC disconnector when the threshold value of the intermediate circuit voltage is at least equal to the peak line voltage of the supply network. For a three-phase inverter, this corresponds to the phase-to-phase peak voltage.

BRIEF DESCRIPTION OF THE DRAWINGS

The invention will be explained in further detail by reference to the attached drawings. Shown are.

DETAILED DESCRIPTION OF THE PREFERRED EMBODIMENTS

Figure 1:
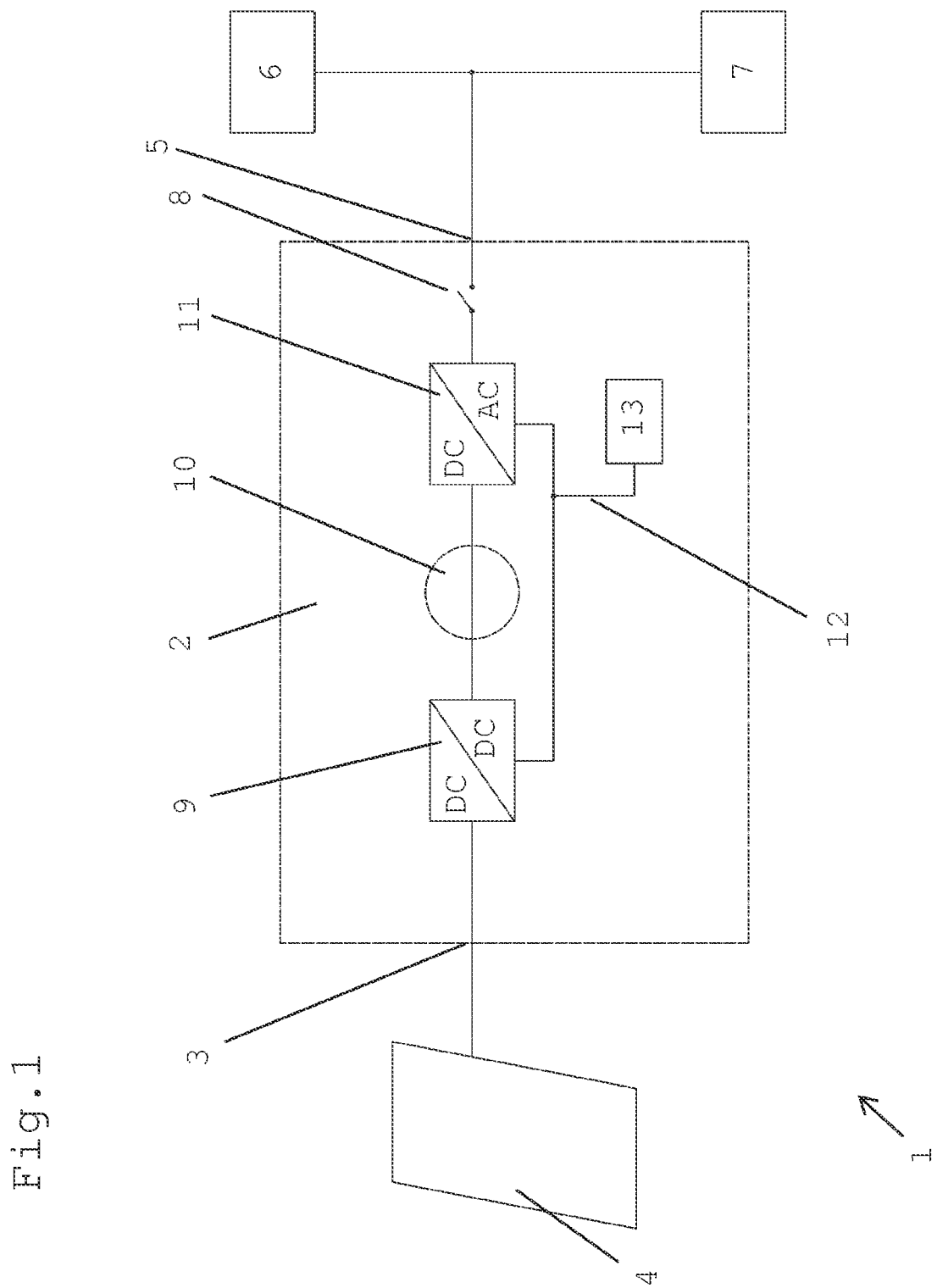
FIG. 1 a block circuit diagram of a common photovoltaic system.

FIG. 1 shows a schematic block circuit diagram of a common photovoltaic system 1. The photovoltaic system 1 comprises a photovoltaic inverter 2, which is preferably formed by an RF inverter. The DC voltage source or DC source 4 is connected to the DC voltage input or DC input 3 of the photovoltaic inverter 2, and is preferably formed by one or more solar panels connected in parallel and/or in series. The AC voltage output or AC output 5 of the photovoltaic inverter 2 is connected to the supply network 6 and, if present, consumers 7. For example, the consumers 7 are formed by a motor, a refrigerator, a radio set, etc. Likewise, the consumer 7 can also be a domestic supply. An AC disconnector 8 is located before the AC output 5 in the photovoltaic inverter 2, in order to be able to disconnect the latter from the supply network 6 and from any consumers 7 that may be present, or to connect the photovoltaic inverter 2 to the supply network 6 and the consumers 7 only when sufficient energy is provided by the DC source 4. The photovoltaic inverter 2 has a DC-DC converter 9 on the input side, a intermediate circuit 10 and a DC-AC converter 11 on the output side. The individual components of the photovoltaic inverter 2 are usually connected to a control device 13 via a data bus 12. The control device 13 is formed by a microprocessor, a microcontroller or a computer, for example. The control device 13 can be used to perform an appropriate control of the individual components, such as the DC-DC converter 9 or the DC-AC converter 11, in particular, the switching elements arranged therein, as well as the AC disconnector 8. For this purpose, the individual open-loop or closed-loop control sequences are stored in the control device 13 by means of appropriate software programs and/or data or characteristic curves.

The energy management of such a so-called network-coupled photovoltaic inverter 2 is optimized for delivering the maximum energy consumption, or feeding in depending on the tariff. In addition, the energy management can implement the covering of current peaks (peak shaving). Of course, multiple photovoltaic inverters 2 can also be connected in parallel, resulting in more energy being available and more power being able to be provided for operating the consumers 7, or for feeding into the supply network 6.

Figure 2:
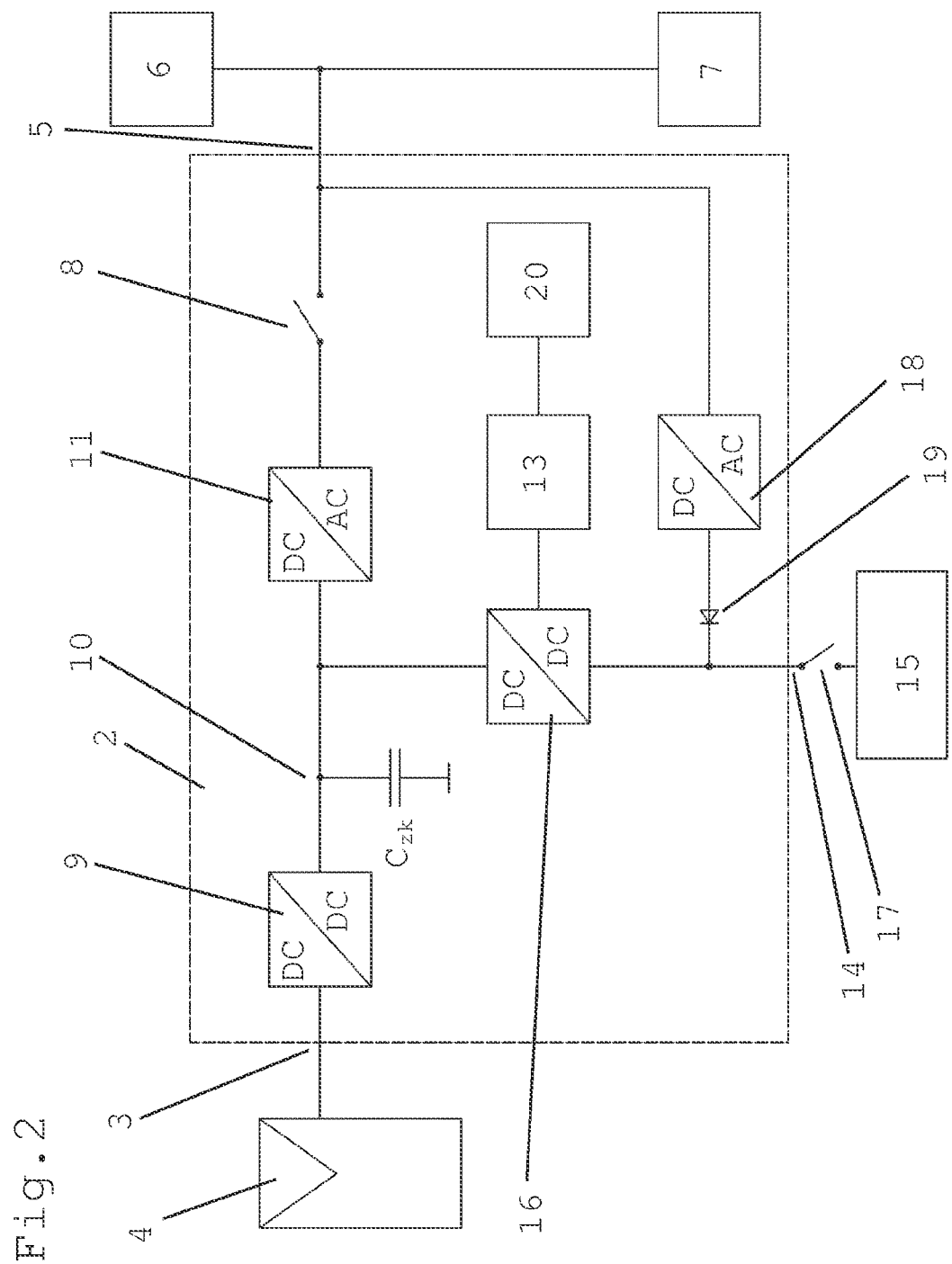
FIG. 2 a block circuit diagram of an embodiment of a photovoltaic inverter according to the present invention.

FIG. 2 shows a block circuit diagram of a photovoltaic inverter 2 according to the invention, wherein a buffer battery 15 can be connected via a battery connection 14, in order to be able to supply at least selected consumers 7 with electrical energy even if the DC source 4 is not supplying any energy, for example during twilight hours, at night, when there is snow on the solar panel, or if the solar panel has been disconnected from the photovoltaic inverter 2 (for example, due to maintenance work, damage by wild animals, or theft). The buffer battery 15 is connected via a battery stage 16 to the intermediate circuit 10 having the corresponding intermediate circuit capacitor $C_{ZK}$. A battery switch 17 can be arranged between the battery connection 14 and the buffer battery 15, which is formed by a relay, for example. The battery switch 17 can be arranged in the photovoltaic inverter 2, in the buffer battery 15 or between the buffer battery 15 and the photovoltaic inverter 2. If the battery switch 17 is integrated in the photovoltaic inverter 2, then the switched-mode power supply 18 is connected on the output side to the battery stage 16 instead of the battery connection 14. Such a photovoltaic inverter 2 is also designated as a hybrid inverter. If the battery switch 17 is arranged internally in the photovoltaic inverter 2, the battery connection 14 is located before the battery switch 17, i.e. between the battery stage 16 and the battery switch 17. The battery switch 17 is also used to ensure that the switched-mode power supply 18 is not loaded by the components of the buffer battery 15.

According to the invention, a switched-mode power supply 18 is provided, which is connected on the input side to the AC output 5 or output of the DC-AC converter 11 of the photovoltaic inverter 2. On the output side, the switched-mode power supply 18 is connected to the battery connection 14 or the output of the battery stage 16 via a diode 19, which prevents a current flow in the direction of the switched-mode power supply 18. If the DC source 4 is deactivated, the intermediate circuit 10 is charged via the battery stage 16 via the switched-mode power supply 18 to a threshold value, which is necessary to enable the photovoltaic inverter 2 to be connected to the supply network 6 and to any consumers 7 present by closing the AC disconnector 8.

The individual components are accordingly connected to a control device 13 (not shown) and can therefore be activated or deactivated and/or controlled or regulated accordingly. The control device 13 also comprises an internal and/or external energy management system. Likewise, the components of the photovoltaic inverter 2 and the control device 13 can be connected to the switched-mode power supply 18 and can be supplied with electrical energy accordingly. In this case, a dedicated switched-mode power supply for supplying the components of the photovoltaic inverter 2 could be omitted.

The DC source 4 can also be connected directly to the intermediate circuit 10 without the DC-DC converter 9. Under solar irradiation, the DC source 4 supplies corresponding energy and the intermediate circuit 10 of the photovoltaic inverter 2 is charged to a voltage of 600 V, for example. This enables electrical energy to be fed into the supply network 6 by activating the DC-AC converter 11 accordingly and closing the AC disconnector 8, which is formed by a relay, for example.

There may also be a requirement that the buffer battery 15 must also be charged. This means that the battery stage 16 is also activated, the battery switch 17 is closed and the buffer battery is charged via the intermediate circuit 10. When the buffer battery 15 is charged or the DC source 4 is no longer supplying energy, for example in twilight hours, the corresponding components can also be deactivated again. Such a photovoltaic system 1 can also be used to extract energy from the buffer battery 15 during night-time hours, which is supplied to the consumers 7 via the AC output 5.

If the buffer battery 15 is empty, the consumers 7 must then be supplied with electrical energy via the supply network 6. For various reasons (such as low electricity price, risk of storms, poor weather forecast, etc.), it may be necessary to charge the buffer battery 15 via the supply network 6 even if the DC source 4 is deactivated.

For this purpose, the DC-AC converter 11 must be activated accordingly and the AC disconnector 8 must be actuated or closed, which requires the voltage $U_{ZK}$ of the intermediate circuit 10 to be charged to a corresponding threshold value. In such cases, in which the DC source 4 is deactivated, the intermediate circuit 10 must therefore first be charged in order to enable the photovoltaic inverter 2 to be connected to the supply network 6 by closing the AC disconnector 8. According to the invention, this is carried out via the battery stage 16, which is supplied via the switched-mode power supply 18 from the AC output 5 of the photovoltaic inverter 2.

Once the buffer battery 15 is discharged, the battery switch 17 is opened, i.e. the buffer battery 15 is disconnected from the photovoltaic inverter 2.

After the switched-mode power supply 18 can only provide a limited power/voltage, this is charged accordingly from the battery stage 16, which is preferably designed as a bidirectional DC-DC converter, in particular as a step-up converter or booster. In doing so, it is ensured that the switched-mode power supply 18 is not overloaded and the battery switch 17 is opened. To avoid overloading the switched-mode power supply 18, the battery stage 16 is activated accordingly when charging the intermediate circuit voltage $U_{ZK}$. For this purpose, the battery stage 16 is connected to the control device 13 of the photovoltaic inverter 2. The corresponding control rules can be stored in a programmable memory 20 connected to the control device 13.

Figure 3:
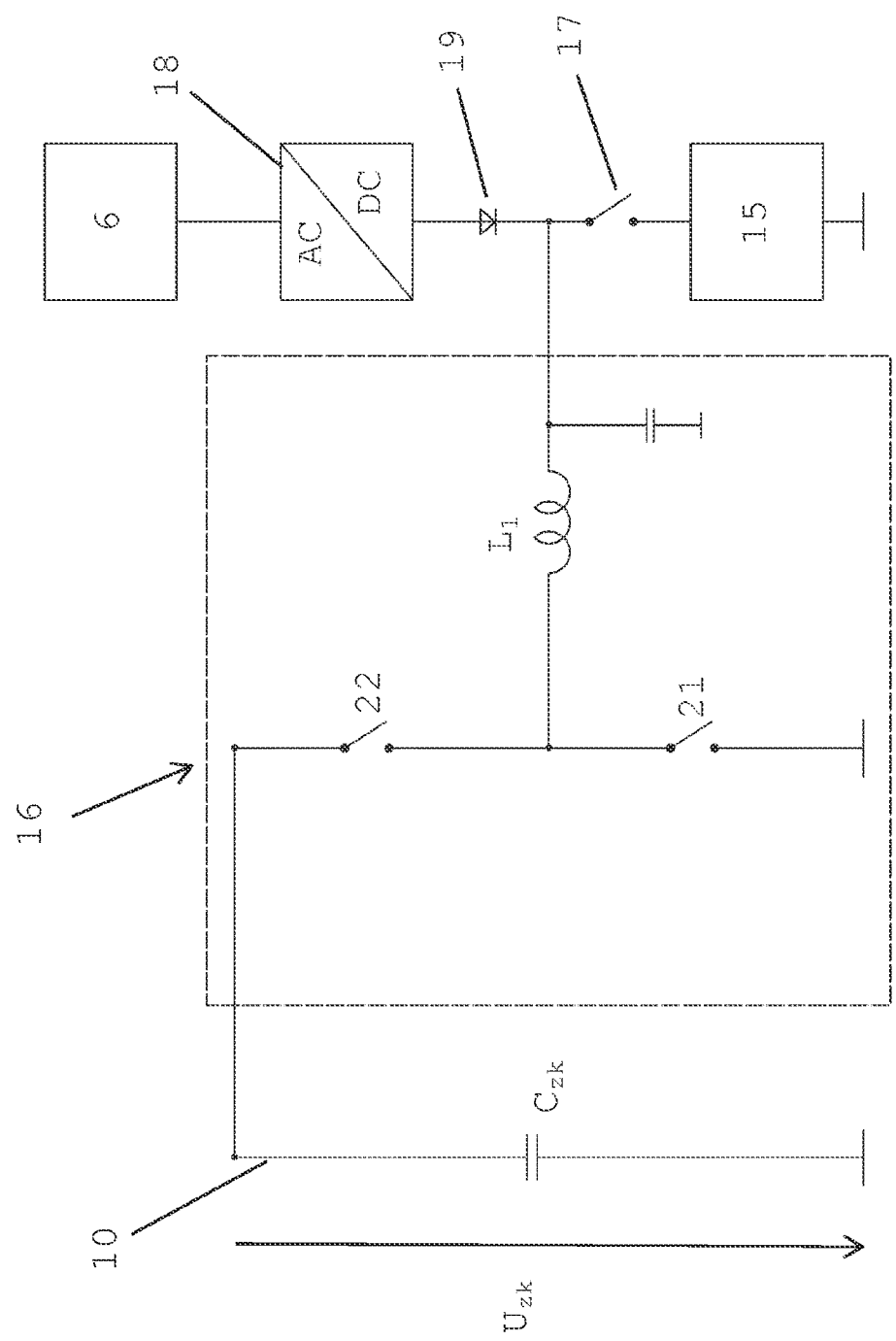
FIG. 3 a block diagram of an embodiment of the battery stage of the photovoltaic inverter according to the invention.

The battery stage 16 is designed, for example in accordance with FIG. 3, as a boost converter with synchronous rectification. The semiconductor switches, the low-side switch 21 and high-side switch 22 are activated with a duty cycle D(t). The low-side switch 21 is activated with the duty cycle D(t) and the high-side switch 22 with the inverted duty cycle 1−D(t). To ensure that the current I through the inductance L1, supplied by the switched-mode power supply 18, remains constant on average, the duty cycle D(t) is controlled accordingly.

The duty cycle D(t) is selected in such a way that an essentially constant and acceptable power/energy (in relation to the overloading of the switched-mode power supply 18) is extracted from the switched-mode power supply 18—for example a few Watts (3 W). To ensure this, the energy or voltage $U_{ZK}$ in the intermediate circuit 10 must increase according to a predefined function from an existing initial value of the intermediate circuit voltage $U_{ZK}$, the start value, to the desired final value, for example the peak line voltage. For example, the duty cycle is calculated as $D(t)=1-(U_{SNT}/U_{ZK,soll}(t))$, where $U_{SNT}$ represents the output voltage of the switched-mode power supply 18 or the voltage on the intermediate circuit 10 at the start of the uploading process, and $U_{ZK,soll}(t)$ the time-dependent target value of the intermediate circuit voltage. The intermediate circuit voltage $U_{ZK}(t)$ increases as a function of time t according to a root function, according to which the voltage increase is steeper at the beginning and the rate of increase flattens off with increasing time. The longer intermediate circuit 10 is charged, therefore, the more the current flowing into the intermediate circuit 10 decreases.

In the first step, to determine the duty cycle D(t) the actual value of the intermediate circuit voltage $U_{ZK}$ is measured and defined as the start value. This means that the initial energy of the intermediate circuit 10 is known. The output voltage $U_{SNT}$ of the switched-mode power supply 18 is constant and is 130V, for example.

After constant power is only being extracted from the switched-mode power supply 18, the energy/voltage of the intermediate circuit increases according to the initial energy plus the energy supplied. For example, the sampling rate is 1 ms (1 kHz), so that a corresponding amount of energy is supplied cyclically every ms. This results in an increase in the intermediate circuit voltage $U_{ZK}$ in accordance with this energy supplied. Since the supplied energy is constant, the intermediate circuit voltage $U_{ZK}$ is determined and does not have to be measured continuously. The duty cycle D(t) is determined continuously according to the above formula, for example every ms and the semiconductor switches 21 and 22 of the battery stage 16 are activated accordingly. The desired intermediate circuit voltage $U_{ZK}(t)$, which is at least equal to the peak line voltage or the peak phase-to-phase voltage and depends on the topology of the photovoltaic inverter 2, is therefore reached after a short time, for example a few minutes (e.g. 2 minutes). The AC disconnector 8 can then be closed and the DC-AC converter 11 activated, so that the buffer battery 15 is charged from the supply network 6 via the intermediate circuit 10.

The present photovoltaic inverter 2 and the method for operating the same allows connection to the supply network 6 or the consumers 7 even if the DC source 4 is not supplying any energy, so that the buffer battery 15 can be charged via the supply network 6 or energy can be fed into the supply network 6 from the buffer battery 15. Likewise, reactive power can be compensated by the photovoltaic inverter 2. The cost of this function, which improves energy management, is particularly low, as already existing components of the photovoltaic inverter 2 are used.

The invention claimed is:

1. A photovoltaic inverter (2) comprising:
    a DC input (3) for connection to a DC source (4),
    a DC-DC converter (9) connected to the DC input (3),
    an intermediate circuit (10),
    a DC-AC converter (11),
    an AC disconnector (8),
    a control device (13) connected to the components of the photovoltaic inverter (2),
    an AC output (5) for connection to a supply network (6),
    a battery stage (16) formed by a bidirectional DC-DC converter and connected with the intermediate circuit (10),
    a battery connection (14) for connection to a buffer battery (15), and
    a battery switch (17) for connecting and disconnecting the buffer battery (15),
    wherein a switched-mode power supply (18) is provided, which switched-mode power supply (18) is connected on the input side to the AC output (5) and on the output side to the battery stage (16),
    wherein the control device (13) is designed to charge up the intermediate circuit (10) to a threshold value via the switched-mode power supply (18) and the battery stage (16) when the DC source (4) is deactivated and the buffer battery (15) is disconnected from the photovoltaic inverter (2), and then to actuate the AC disconnector (8) and to connect the photovoltaic inverter (2) to the supply network (6), in order to charge up the buffer battery (15) via the supply network or to compensate reactive power from the photovoltaic inverter (2) after the connection.

2. The photovoltaic inverter (2) according to claim 1, wherein a diode (19) is arranged on the output side of the switched-mode power supply (18).

3. The photovoltaic inverter (2) according to claim 1, wherein the battery stage (16) is formed by a boost converter with synchronous rectification with two semiconductor switches (21, 22).

4. The photovoltaic inverter (2) according to claim 3, wherein the battery stage (16) is connected to the control device (13), which is designed to charge the intermediate circuit (10) with essentially constant power drain from the switched-mode power supply (18) by allowing the semiconductor switches (21, 22) of the boost converter to be activated with a predefined duty cycle (D(t)).

5. The photovoltaic inverter (2) according to claim 4, wherein the control device (13) is connected to a programmable memory (20).

6. A method for operating a photovoltaic inverter (2), wherein the photovoltaic inverter (2) has a DC input (3) for connection to a DC source (4), a DC-DC converter (9) connected to the DC input (3), an intermediate circuit (10), a DC-AC converter (11), an AC disconnector (8), a control device (13) connected to the components of the photovoltaic inverter (2), an AC output (5) for connection to a supply network (6), a battery stage (16) formed by a bidirectional DC-DC converter and connected with the intermediate circuit (10), and a battery connection (14) for connection to a buffer battery (15) via a battery switch (17), wherein a switched-mode power supply (18) is supplied by the AC output (5) and the control device (13) is designed, when the DC source (4) is deactivated and the buffer battery (15) is disconnected from the photovoltaic inverter (2), to charge the intermediate circuit (10) via the switched-mode power supply (18) and the battery stage (16) up to a threshold value, whereupon the AC disconnector (8) is actuated and the photovoltaic inverter (2) is connected to the supply network (6) and after the connection the buffer battery (15) is charged up via the supply network or reactive power from the photovoltaic inverter (2) is compensated.

7. The method according to claim 6, wherein the intermediate circuit (10) is charged with constant power via the switched-mode power supply (18) by the battery stage (16) being formed by a boost converter with synchronous rectification having two semiconductor switches (21, 22), which semiconductor switches (21, 22) are activated via a corresponding duty cycle (D(t)).

8. The method according to claim 7, wherein before charging the intermediate circuit (10) via the switched-mode power supply (18), the voltage ($U_{ZK}$) on the intermediate circuit (10) is measured and used as a starting voltage, and the duty cycle (D(t)) is determined as a function of the starting voltage.

9. The method according to claim 6, wherein the AC disconnector (8) is actuated when the threshold value of the voltage ($U_{ZK}$) of the intermediate circuit (10) is at least equal to the peak line voltage of the supply network (6).

* * * * *